Feb. 27, 1962  G. H. HERRICK ET AL  3,022,739
MOTOR AND PUMP APPARATUS
Filed July 24, 1959
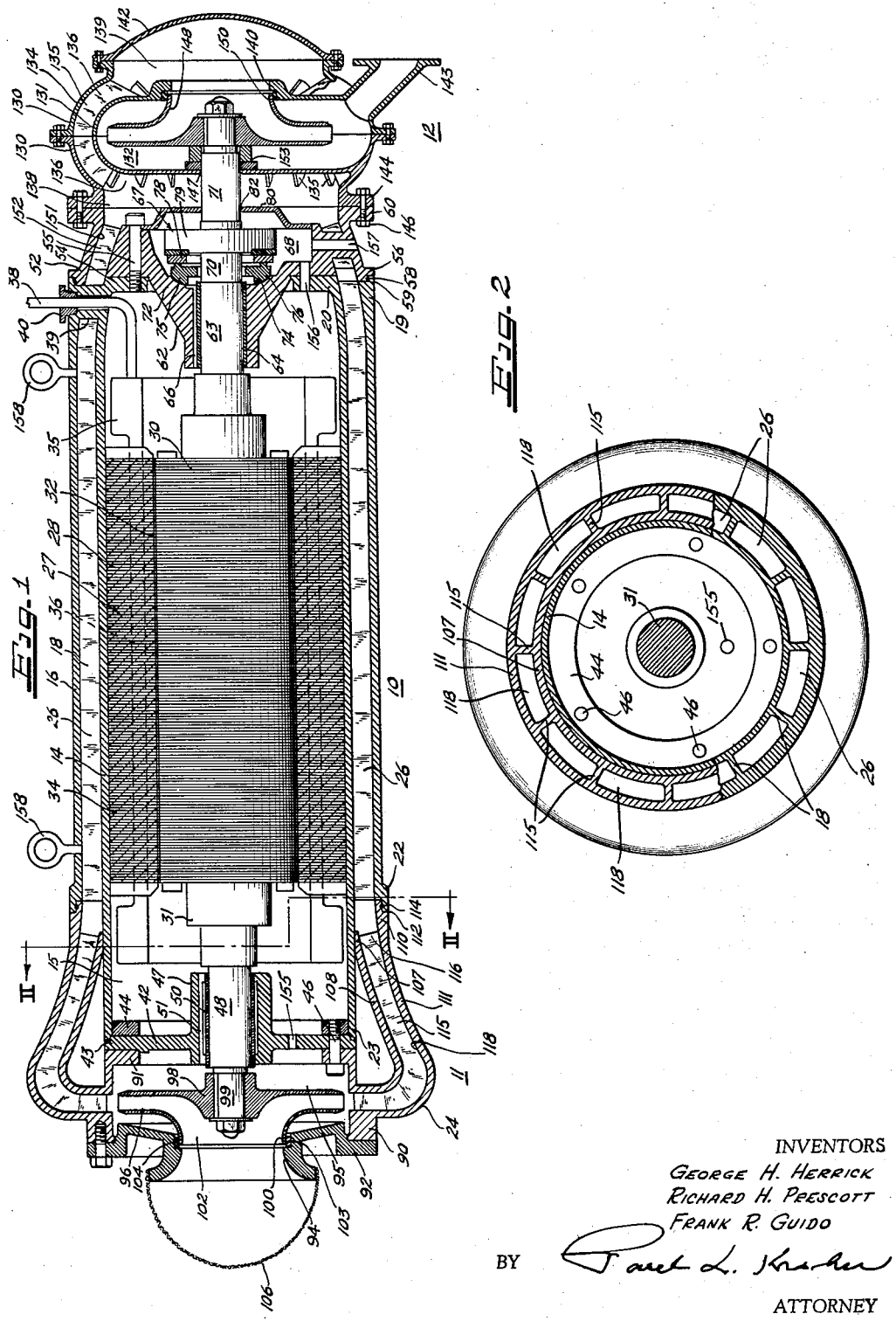
INVENTORS
GEORGE H. HERRICK
RICHARD H. PRESCOTT
FRANK R. GUIDO
BY
ATTORNEY

United States Patent Office 3,022,739
Patented Feb. 27, 1962

3,022,739
MOTOR AND PUMP APPARATUS
George H. Herrick, Beloit, Wis., and Richard H. Prescott, South Beloit, and Frank R. Guido, Highland Park, Ill., assignors to Fairbanks, Morse & Co., Chicago, Ill., a corporation of Illinois
Filed July 24, 1959, Ser. No. 829,319
3 Claims. (Cl. 103—87)

This invention relates to motor powered apparatus embodying electric motor and pump means in a unitary assembly adapted for operation while submerged in a body of fluid or liquid such as water. The invention is concerned more particularly, with the provision of an improved submersible unit of the general character indicated, having the electric motor internally flooded in the submerged condition of the unit, and embodying means for affording effective motor cooling and lubrication of the motor bearings.

The principal object of the present invention is to provide an improved unitary submersible assembly of the character indicated, including an electric motor and motor driven pump means at one end thereof having its suction inlet open to the fluid body in which the assembly is submerged, wherein effective motor cooling is attained by confining the major portion of the pressure fluid output of such pump means to passage longitudinally of the motor in close external enveloping relation thereto, and circulating the remainder of the pump output internally through the motor and in cooling and lubricating relation to the motor bearings.

Another object is to afford an improved submersible assembly of unitary character, providing an electric motor unit, a motor driven pump unit at one end of the motor unit and having its suction inlet open to the fluid body in which the assembly is submerged, and a second motor driven pump unit at the other end of the motor unit, wherein the discharge outlet of the first mentioned pump unit is connected to the suction inlet of the second pump unit by passage means including passageways extending longitudinally of the motor unit in close external enveloping relation thereto, and wherein the motor unit is open to the pressure discharge side of the first mentioned pump unit for establishing pumped fluid circulation into and through the motor unit, to discharge externally of the motor unit through outlet port means in the motor end adjacent the second pump unit.

A further object is to provide a submersible assembly of the character indicated, wherein the motor bearings are accessible for ready removal as for inspection, repair or replacement.

The foregoing and other objects and advantages of the present invention will become apparent from the following description of a presently preferred embodiment thereof, as exemplified in the accompanying drawing, wherein:

FIG. 1 is a longitudinal sectional elevation of the assembly, according to the preferred embodiment, and FIG. 2 is a transverse sectional elevation thereof, as taken along line II—II in FIG. 1.

With reference to the drawing, the illustrated assembly comprises an electric motor unit 10, a pump unit 11 at one end of the motor unit, and a second pump unit 12 at the other end of the motor unit. The pump units are carried by the motor unit in readily detachable manner to be described hereinafter. It is to be noted here, that the casing, frame and other parts of the several units are provided of corrosion-resistant materials (with the motor windings protected by suitable water-proof, corrosion-resistant sheathing), which may be selected with particular regard to the character of the fluid in which the assembly is to be submerged.

The motor unit 10 includes a casing structure providing an inner tubular wall member 14 defining a motor chamber 15, and an outer wall member 16 surrounding wall member 14 and uniformly spaced therefrom by longitudinal ribs 18 preferably integral with the wall members. Outer wall 16 is substantially coterminous at its end 19 with the end 20 of the inner wall, and has its opposite end 22 terminating short of the inner wall end 23 by a distance predetermined to accommodate connection with the pump discharge outlet member 24 presently to be described. The ribs 18 which extend over the length of the outer wall and are, preferably, equally angularly spaced about the inner wall, form with the walls 14 and 16 a plurality of longitudinal passages or passageways 26 in close external embracing or enveloping relation to the motor chamber 15 (see FIG. 2). Moreover, the casing walls and especially inner wall 14 and ribs 18, are formed of good heat conducting materials and have minimum wall thickness consonant with the predetermined required structural strength of these parts.

Disposed in the motor chamber 15 is an electric motor, indicated generally at 27, which in the present example is a polyphase induction motor of conventional radial gap type, having an annular stator 28 and a cooperating induction rotor 30 suitably fixed on the motor drive shaft 31, with suitable gap clearance 32 relative to the inner cylindrical surface of the stator core 34. The stator core 34 of slotted and preferably laminated construction, has its outer surface seating against the inner casing wall 14 in suitable securement thereto, and carries field windings 35 the legs of which extend in and through the core slots indicated in dotted lines at 36. Polyphase power connection to the motor field windings is made through conductor cable 38 which enters the motor chamber 15 through an apertured boss 39 integral with casing walls 14 and 16 therebetween. The motor end of the cable is fixed against pull-out, as by a suitable pressure seal clamp 40 firmly embracing the cable and removably fixed in the outer end of the apertured boss 39.

The motor shaft 31 is rotatably supported by bearing means now to be described. Spanning the end 23 of the tubular wall 14, is an end closure or wall element 42 having its outer circular marginal portion 43 in side abutment with a mounting ring 44 internally of wall 14 and suitably secured thereto. Wall element 42 is detachably connected to the mounting ring by a suitable number of bolts (one shown at 46) preferably threaded into the ring, these bolts being utilized in motor mounting of the pump unit 11 presently to be described. The wall element 42 provides a central or axial bearing hub 47 receiving therethrough the journal end portion 48 of shaft 31. Seated in hub 47 is a sleeve type radial bearing 50 embracing the shaft journal end 48, the sleeve bearing having axially extending fluid grooves or passages 51 open to the ends of the hub 47.

Spanning the opposite end of the motor casing including the end 19 of the outer wall member 16, is an end closure or wall element 52 which is detachably secured to an inturned annular flange 54 integral with the end 20 of the inner casing wall 14, as by a suitable number of bolts (one shown at 55) threaded into the flange. The wall element 52 provides an annular peripheral flange 56 at its inner side, engaging the end 19 of outer casing wall 16 by a rabbet joint 58 therewith, including an annular O ring seal 59 at such joint. Wall element 52 here serves not only as a bearing support, but as a mounting bracket for the pump unit 12, for which purpose it is formed to provide a peripheral mounting flange 60 at its outer side. In integral off-set extension centrally from the body of wall element 52 is a bearing hub 62 receiving therethrough the opposite journal end portion 63 of motor shaft 31. The bearing hub supports therein a sleeve type radial bearing 64 embracing the shaft journal portion 63, the bearing including axially extending fluid grooves or passages 66 open to the ends of the hub 62.

The motor rotor is additionally supported against axial thrust forces imposed by the driven unit 12 in particular, such support being a thrust bearing 67 which may be of the so-called "Kingsbury" thrust pad type. As shown in FIG. 1, the body of end closure wall element 52 is formed to provide a central pocket or recess 68 open at the outer side of the wall element, and through which projects the outer end 70 of motor shaft 31. Shaft end 70 terminates in a reduced-diameter terminal pump drive end 71 forwardly beyond the wall element 52. The bottom of the recess is constituted in part by the outer end portion 72 of the hub 62, which portion is formed to provide a part-spherical seat 74 concentric to the axis of radial bearing 64. Encircling the shaft end 70 in the recess is a ring member 75 having a part-spherical surface 76 for seating of the ring on seat 74. Ring member 75 is the normally stationary thrust pad support element of the thrust bearing, this member affording in known manner, support of thrust pad elements 78 arranged in an annular series. Engaging the pad elements 78 in sliding contact therewith, is a thrust bearing runner 79 which is suitably mounted on shaft end 70 for rotation therewith. The thrust bearing thus provided for the motor shaft, possesses the advantage of self-centering of the thrust pad and ring member assembly under thrust pressures applied by the runner 79, as permitted by the part-spherical seating of ring 75 on seat 74. The pocket or recess 68 is here closed for a purpose to appear, as by a removable cover member 80 retained in place by the screws 55 and having a central opening 82 to accommodate shaft end 71 with small running clearance therethrough.

Turning now to the pump unit 11, it is of centrifugal type providing a generally cylindrical housing part 90 having an inturned annular flange 91 at its inner side, by which the unit housing is removably mounted on the motor end wall element 42 as by the screws 46. Closing the outer side of housing part 90 is a cover wall 92 which is formed to provide the central, outwardly flaring pump suction inlet opening 94. Housing part 90, cover wall 92 and the motor end wall element 42, thus form the pumping chamber 95 in which rotates a shrouded centrifugal impeller 96 having its hub 98 seated on and secured in driven relation to the projecting terminal end 99 of the motor shaft 31. The circular margin 100 of the impeller at its inlet eye 102, extends in an annular recess 103 in the cover 92 adjacent the inlet opening 94 and may be provided with a running seal therein. Such running seal means indicated at 104, may be of any well known form and is provided to minimize fluid by-pass or leakage between the pumping chamber 95 and the suction inlet 94. The fluid intake to the pump unit 11 is from the body of fluid in which the assembly is submerged, and so, the pump suction inlet 94 opens directly to such fluid body. However, in order to prevent pump entrance of foreign matter which may be contained in the fluid body, the suction inlet is here covered by a suitable screen member 106.

Included as an integral part of the pump housing 90 and projecting from the periphery thereof, is the hereinbefore noted pump discharge outlet member 24. This member is an annular, double-wall structure in curved extension as illustrated, having the terminal margin 107 of its inner wall 108 in embracing engagement externally on the inner motor casing wall 14, and the terminal margin 110 of its outer wall 111 engaging the end 22 of motor casing outer wall 16 by a rabbet joint 112 therewith. The joint 112 is here sealed by a suitable O ring seal 114. Walls 108 and 111 of the member 24 are structurally joined by a plurality of equally angularly spaced integral ribs provided as diffuser vanes 115, the number of these vanes being equal to the number of ribs 18 in the motor casing and each having its outer terminal end 116 in substantial longitudinal alignment with one of the ribs 18. The vanes thus form diffuser passages 118 open to the pumping chamber 95 in substantial alignment with the outer periphery of impeller 96, and extending to communication with the motor casing passages 26.

Under motor drive of the pump unit 11, the major portion of the pump pressure discharge (the remainder or minor portion of the pressure fluid in the pumping chamber 95 being circulated internally of the motor unit in a manner to be hereinafter described) is delivered by the diffuser passages 118 to the motor casing passageways 26. Since these passageways envelop the motor unit longitudinally thereof, the fluid in pressure flow along the passageways, effects very material cooling of the motor by absorption and removal of the motor heat in conduction through the inner casing wall 14. The fluid flow under the discharge pressure of the pump unit 11, is delivered from the passageways 26 to the second pump unit 12 in a manner now to be described.

Pump unit 12, which in the present embodiment is a second stage pump comprises a two-part casing structure 130 providing inner wall means 131 forming a pumping chamber 132 of volute form, and outer wall means 134 spaced from and integrally joined to the inner wall means by a plurality of ribs 135. The ribs and wall means form a plurality of passages 136 extending over the inner wall means between the inner side opening 138 of the outer wall (left end as viewed in FIG. 1) and the pump suction chamber 139 at the forward side of the unit. Open to the suction chamber 139 is the suction inlet opening 140 in the inner wall axially of the pumping chamber 132, while access to the suction chamber is provided by a removable closure plate 142. Discharge from the volute pumping chamber 132 is here afforded by a discharge outlet conduit 143, as shown.

Unit 12 is removably mounted on the motor end wall element 52, the outer wall of the unit having for this purpose a mounting flange 144 at its open inner side 138, for engagement with the flange 60 and bolting thereto as by bolts 146. In unit mounting, the motor shaft terminal end 71 projects through a shaft opening 147 in the inner wall 131 into the pumping chamber 132, wherein it supports a shrouded centrifugal impeller member 148 in driven connection thereto. The impeller has its suction eye portion 150 in registry with the suction opening 140 and preferably in close running seal relation to the wall margin at the opening 140.

The motor end wall element 52 is formed in the peripheral portion of the body thereof, to provide through-passages 151 separated by integral ribs 152, the passages 151 being equal in number to the number of motor casing passageways 26 and each in alignment with one of the latter. Thus the passages 151 which here form or constitute the outlet ends of the passageways 26, open the motor casing passageways to the opening 138 of unit 12, for the admission of pressure fluid through opening 138 to the passages 136. Pressure fluid flows through passages 136 into suction chamber 139 and thence into the impeller suction eye 150 for pressure-boosted discharge by the impeller to the pumping chamber and out the discharge outlet conduit 143. While not here shown, conduit means may be connected to the second stage pump outlet 143 for conveying the pressure fluid to any desired point of use. Moreover, in order to reduce or prevent leakage by-pass of pressure fluid from pumping chamber 132 through the shaft opening to the lower pressure region adjacent the side opening 138, the shaft opening 147 is closed about the shaft by a suitable running seal indicated generally at 153.

Returning to the motor unit 10, provision is here made for fluid circulation internally through the motor and in cooling and lubricating relation to the several motor bearings. The radial bearing 50 is exposed to the pumping chamber 95 for admitting pressure fluid between the bearing and shaft portion 48 therealong to lubricate the bearing surfaces, such fluid then passing into the motor chamber 15. Also and for bearing cooling, the bearing has the heretofore noted grooves or passages 51 which admit pressure fluid from pumping chamber 95 over the bearing and into motor chamber 15. Additionally and in order to establish positive pressure circulation in the motor chamber to ultimate discharge in a manner presently to appear, the motor end wall element 42 is provided with one or more metering ports or openings 155 directly communicating the motor chamber 15 with the pumping chamber 95, so that pressure fluid may pass from the latter into the motor chamber for motor cooling circulation together with the pressure fluid passing the bearing 50, about the motor means 27. The circulation in respect to the motor means, is longitudinally through the motor rotor gap 32 and through the stator winding slots 36, it being noted here that the slot legs of the stator windings 35 afford spaces in the slots for such fluid circulation. Moreover, the windings 35 have the conductors thereof effectively insulated from fluid contact therewith, as by fluid proof coverings or sheathings of suitable known materials and applied in known manner.

At the opposite end of the motor unit, the pressure fluid in motor chamber 15 passes between radial bearing 64 and shaft portion 63 in lubricating relation thereto, and in bearing cooling flow through bearing grooves 66, to and into the thrust bearing recess or pocket 68. Also, one or more ports are provided in the motor casing end wall element 52 between the motor chamber and recess 68, for direct flow of pressure fluid into the recess. One such port is shown at 156 including a portion thereof through the casing flange 54. The pressure fluid thus passing into recess 68 from the motor chamber 15, circulates in lubricating and cooling relation to the thrust bearing 67, and is discharged to the surrounding body of fluid in which the assembly is submerged, through one or more outlet ports or passages formed in the body of end wall element 52 and opening to the exterior of the motor casing, one such passage being shown at 157.

The motor-pump assembly as shown and described, is submerged in a body of fluid such as water for example, with submerged support thereof effected in desired manner. To facilitate cable suspension of the assembly in the fluid body, where such is desired, the motor casing structure is provided with cable mounting eye-bolts 158 at suitably spaced points therealong. In initial submergence of the assembly and before energization of the motor, both pump units and interconnecting passages will become flooded, while the interior motor chamber will become flooded by flow of fluid past the bearings and through the ports 155, 156 and 157. Then, upon energization of the motor to drive the pump units 11 and 12, it will be apparent that the major portion of the pressure fluid discharge established by pump unit 11 passes through the passageways 26 externally enveloping the motor means, to the second stage pump unit 12 for increased pressure discharge at the second stage pump outlet 143. At the same time, the remaining portion of first stage pump discharge passes from pumping chamber 95 past the bearing 50 and through port means 155 into the motor chamber 15, circulating through this chamber in cooling relation to the motor therein, and then passing the bearing 64 and through port means 156 into thrust bearing recess 68 for cooling and lubricating the thrust bearing, and then to discharge externally of the motor unit through outlet means 157. Thus, the fluid pressure flow in passageways 26 together with the pressure circulation in the motor chamber, produces required motor cooling, while the pressure flow in relation to the motor bearings as described, effects the required lubrication and cooling of these parts. It is to be noted here, that while the shaft opening 82 in the cover plate 80 preferably has a minimum shaft clearance, some fluid leakage will occur through such opening into the thrust bearing recess 68, because of the normally higher fluid pressure externally of the cover plate in the region of the side opening 138 of pump unit 12. However, such leakage into the recess 68 will enhance fluid circulation about the thrust bearing, and thus aid in assuring effective lubrication of the runner and pad bearing surfaces.

In the present unitary assembly, each of the pump units may be readily removed without disturbing the remainder of the assembly. Thus, pump unit 11 is removable upon detaching its impeller from the motor shaft and detaching the mounting bolts 46, and the same applies to unit 12 with detachment of its impeller and the mounting bolts 146. Upon removal of pump unit 11, the motor casing end wall 42 carrying the shaft bearing 50 is then free for removal, as for bearing inspection, repair or replacement. Similarly at the opposite end of the motor and upon removal of pump unit 12, direct access may be had to the thrust bearing with removal of the recess cover plate 80 by detachment of bolts 55, while following thrust bearing removal, the motor end wall 52 may be removed for direct access to bearing 64.

Having now described and illustrated a unitary submersible motor-pump assembly in one preferred embodiment according to the present invention, it is to be understood that many modifications thereof are contemplated and may be made without departing from the spirit and scope of the invention as hereinafter defined and claimed.

What is claimed is:

1. In a unitary assembly of the character described for operation submerged in a body of fluid, a casing having an inner tubular wall defining a casing chamber and means including an outer wall about the inner wall defining fluid passageways longitudinally of the casing, a motor in said casing chamber including a longitudinally extending drive shaft, a first wall member closing one end of said casing chamber and providing bearing means rotatably supporting said drive shaft, a second wall member closing the other end of the casing chamber and providing bearing means rotatably supporting said drive shaft, said second wall member providing a recess and having a thrust-bearing seat in the recess, thrust bearing means between said seat and the drive shaft, a closure on said second wall member closing said recess, pump means mounted on said first wall member including a pumping member in driven connection with said drive shaft, said pumping means having a suction inlet for admission of fluid from the fluid body and discharge outlet means connected to said passageways, said first wall member having port means communicating the pumping means with said casing chamber for the admission of pressure fluid to the latter, said second wall member having port means between said casing chamber and said recess for the passage of pressure fluid into the latter and about the thrust bearing means in the recess, and the second wall member further having a discharge outlet from said recess to the casing exterior and passages open to and forming the outlet ends of said passageways.

2. In a unitary assembly of the character described for operation submerged in a body of fluid, a generally tubular casing including detachable end closures, providing a central chamber and longitudinally extending passageways externally about the central chamber, motor means in said central chamber including a drive shaft extending longitudinally therein and outwardly through said end closures, bearing means on the end closures rotatably supporting the drive shaft, one of said end closures providing a recess in the outer side thereof and a thrust-bearing seat in the recess, thrust bearing means in the recess between the drive shaft and said seat, a wall element on said one end closure closing said recess, pump means carried by the casing assembly externally adjacent the other of said end closures and including a pumping chamber and a rotary impeller therein mounted on the drive shaft; the pump means having a suction inlet for impeller admission of fluid from the fluid body and discharge conduit means connecting the pumping chamber to said passageways, said other end closure having restricted port means communicating said pumping chamber and said central chamber, said one end closure having port means between said central chamber and said recess and discharge passage means from the recess to the exterior of the casing assembly, and said one end closure further having passages open to and forming the discharge ends of said passageways, the assembly in submerged condition having said central chamber fluid filled through said port means and discharge passage means, and with fluid filling the pumping chamber, said discharge conduit means, said passageways and said discharge end passages thereof, whereby upon motor rotation of said impeller, pressure flow of fluid will be thereby established to and through said passageways to discharge through said discharge end passages, while fluid under pressure in said pumping chamber passes by pressure flow through said restricted port means into and through said central chamber in cooling relation to the motor therein, then through said port means into said recess and in cooling and lubricating relation to said thrust bearing means in the recess, and thence to discharge through said discharge passage means.

3. In a unitary assembly as defined by claim 2, wherein the bearing means on the said other end closure is exposed to the said pumping chamber for pressure flow of fluid therefrom in lubricating and cooling relation to the bearing means, thence into the said central chamber, and further, wherein the bearing means on the said one end closure is exposed for pressure flow of fluid from the said central chamber in lubricating and cooling relation to the bearing means, thence into the said recess.

References Cited in the file of this patent

UNITED STATES PATENTS

| | | |
|---|---|---|
| 2,406,947 | Harlamoff | Sept. 3, 1946 |
| 2,440,947 | Hart | May 4, 1948 |
| 2,450,137 | Harlamoff | Sept. 28, 1948 |
| 2,733,106 | Kulling | Jan. 31, 1956 |
| 2,814,254 | Litzenberg | Nov. 26, 1957 |
| 2,857,849 | Pezzillo | Oct. 28, 1958 |